United States Patent Office 3,306,383
Patented Feb. 28, 1967

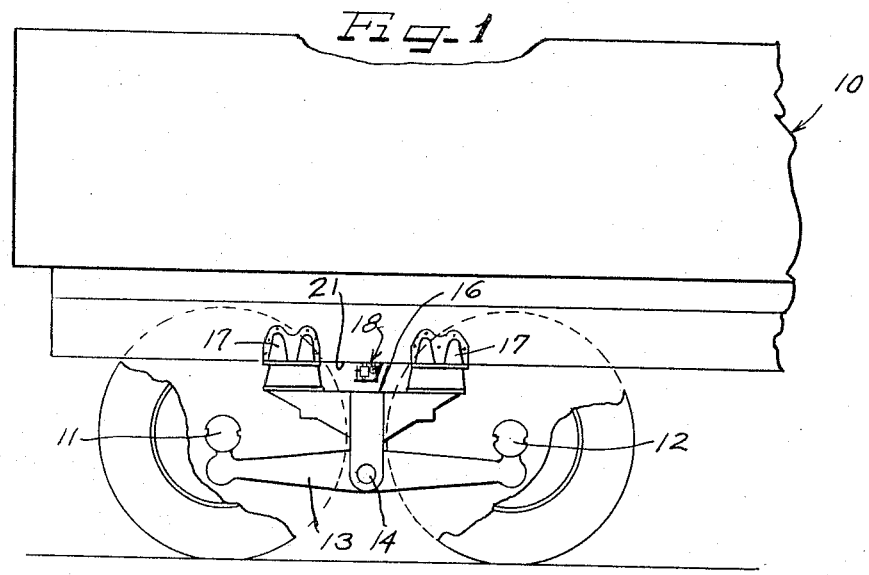

3,306,383
PNEUMATIC-ELECTRIC LOAD WEIGHING DEVICE FOR TRUCKS
Gene R. Saxton and Charles L. Morganti, Chicago, and John K. Morganti, Cicero, Ill., assignors to Morsax Co., a partnership
Filed Jan. 13, 1965, Ser. No. 425,185
5 Claims. (Cl. 177—136)

The present invention relates to a device for continuously weighing a truck being loaded.

In normal circumstances, a truck is loaded at one station, and then moved to a weighing station to make sure that the weight of the load does not exceed the limits prescribed by law. If the loading has resulted in a load which is higher than or lower than the legal limit, the truck operator then has to unload or load additional material into the truck, and repeat the weighing operation until such time as the legal limit is reached. It is just as important to be up to the legal limit as it is to avoid being over the legal limit, since a cargo less than that permitted by highway regulations represents an economic loss to the trucker.

The device of the present invention makes it possible to weigh the load automatically as the loading proceeds, and thereby enables the trucker to come up to the legal limit quickly and accurately, without repeated loadings and weighings.

An object of the present invention is to provide a device for weighing payloads of trucks continuously during the loading operation.

Another object of the invention is to provide a weighing device of the type described which is simple to calibrate, and which can give a direct reading on a meter.

Still another object of the invention is to provide a device for weighing trucks which can be conveniently installed on existing truck bodies with a minimum of expense.

In accordance with the present invention, we provide a device for weighing the payload of a truck which includes a pneumatically operated cylinder, a piston mounted for reciprocation within the cylinder, a variable electrical resistance means, and means operable by movement of the piston to vary the electrical resistance means. The displacement of the truck body due to increased loading causes a variation in the variable resistor, and a bridge circuit including the variable resistor as a branch thereof then measures the amount of change in the electrical resistance which is then translated into terms of amount of weight being added to the truck.

A further description of the present invention will be made in conjunction with the attached sheet of drawings which illustrates a preferred embodiment, but it should be recognized that the invention is not limited to the specific form or the specific details set forth in the drawing.

FIGURE 1 is a fragmentary view in elevation of a tandem truck showing the manner in which the device of the present invention can be incorporated in a typical truck assembly; and FIGURE 2 is a partly schematic view of the entire system in operating relationship with the truck frame.

As shown in the drawings:

In FIGURE 1, reference numeral 10 indicates generally a truck body equipped with a tandem axle unit including a pair of spaced axles 11 and 12 connected to a yoke 13 pivotally supported by a shaft 14. The top of the supporting structure is formed with a pedestal portion 16 which is spaced from the remainder of the frame by means of resilient load cushions 17. This type of suspension is known as the "Hendrickson" tandem suspension, and is merely shown for purposes of illustration.

The improved weighing device of the present invention has been identified at reference numeral 18 in FIGURE 1 which illustrates the position of the device relative to the pedestal 16 and the remainder of the frame. This mounting is better shown in FIGURE 2 of the drawings which illustrates that the weighing device 18 is secured to and depends from a beam 19. One side of the beam 19 is welded or otherwise secured to the frame 21, while the bottom of the beam 19 is secured to a pneumatic cylinder 22 in which a piston 23 is arranged to be reciprocated. A coiled spring 24 in the cylinder tends to urge the piston 23 upwardly and thereby reduce the capacity of the air chamber contained in the cylinder 22. The piston 23 carries a bar 26 which, at one end, has a vertically extending guide rod 27 slidably movable through a guide 28 secured to the cylinder 22. The bar 26 is provided with a ball joint 29 or other type of pivot at one end to pivotally mount an actuating arm 31 thereto. The opposite end of the arm 31 is connected by means of a ball joint 32 or the like to a variable arm 33 of a rheostat 34 having output terminals 36 and 37 respectively.

The cylinder 22 is actuated by means of an air pressure line 38 which gets a supply of compressed air from an air tank 39 carried by the truck. The introduction of air from the tank 39 into the line 38 is controlled by means of an air solenoid generally indicated at reference numeral 41, and a fixed air regulator indicated at reference numeral 42 which supplies a predetermined air pressure to the cylinder 22.

The variable resistance appearing between terminals 36 and 37 of the rheostat 34 is one arm of a bridge circuit consisting of fixed resistors 43 and 44, and a variable resistor 46. A current measuring device such as a meter 47 is connected across opposite sides of the bridge circuit, and the two other sides are connected across a source of potential such as a battery 48. A switch 49 is arranged to apply potential across the bridge circuit, and thereby actuate an indicator lamp 51 showing that the circuit is in operation.

In the operation of the device, when the truck is ready for loading, the operator closes the switch 49 thus applying electrical potential across the bridge circuit, and actuating the air solenoid 41. Compressed air is then fed through the line 38 to the pneumatic cylinder 22, and the air pressure forces the piston 23 downwardly as shown in FIGURE 2, until the bar 26 rests on the pedestal 16, as illustrated in dotted outline in FIGURE 2. At this time, the meter 47 can be calibrated to indicate a no load condition in the truck. Then, as the weight is increased by loading, the pedestal 16 and the frame 21 come closer together, thereby elevating the bar 26 with respect to the cylinder 22, and rotating the actuating arm 33 associated with the rheostat 34. This changes the electrical resistance between the terminals 36 and 37, and this is reflected as a change in current through the ammeter 47. This meter 47 can be conveniently calibrated in terms of weight units or other units to enable the operator to see immediately when the full payload condition is being reached.

As shown in FIGURE 2, provision is made by means of a pair of conductors 52 and 53 to connect the rheostat 34 in series with a similar rheostat in another weighing device located on the other side of the tandem. Thus, the cumulative changes in resistance between all of the various weighing devices will then be reflected as a change of resistance in the bridge circuit, and immediately shown on the meter 47. As a result, the operator has a continuous indication of the amount of load being deposited in the truck and can terminate the loading immediately when the legal load limit is approached. In the event only one weighing device is employed on the truck, conductors 52 and 53 are connected together.

The device of the present invention is efficient in operation and economical to install. It is not subject to severe road shock because when the truck is in motion, the device is supported from the bar 19, and the bar 26 is out of contact with the pedestal 16.

It should be evident that various modifications can be made to the described embodiments without departing from the scope of the present invention.

We claim as our invention:

1. A device for weighing the payload of a truck comprising a pneumatically operated cylinder, a piston mounted for reciprocation within said cylinder, variable electrical resistance means, a movable arm connected to said resistance means to change the resistance thereof, means operable by movement of said piston to displace said movable arm and thereby vary the resistance of said electrical resistance means, and a bridge circuit including said variable electrical resistance means as one branch thereof.

2. In a truck having a frame for supporting a van and a pressurized air system, a device for weighing the payload in said van comprising a pneumatically operated cylinder secured to said frame, conduit means connecting said cylinder to said air system, a piston mounted for reciprocation in said cylinder, variable electrical resistance means, a movable arm connected to said resistance means to change the resistance thereof, means operable by movement of said piston to displace said movable arm and thereby vary the resistance of said electrical resistance means, and a bridge circuit including said variable electrical resistance means as one branch thereof.

3. In a truck having a frame, a pedestal spaced from said frame, and a pressurized air system, a device for weighing the payload in said truck comprising a pneumatically operated cylinder, means securing said cylinder to said frame, a piston reciprocable in said cylinder, said piston having a stroke sufficient to engage said pedestal, a variable resistance means, means connecting said piston to said variable resistance means to vary the resistance of said variable resistance means in response to displacement of said piston, regulator means fed by said pressurized air system and supplying a predetermined air pressure to said cylinder to cause said piston to move sufficiently to bridge the space between said frame and said pedestal, and a bridge circuit including said variable resistance means as one branch thereof, whereby variation in resistance in said variable resistance means due to changes in spacing between said frame and said pedestal are translated into variations in current flow in said bridge circuit.

4. The assembly of claim 3 which also includes an indicating means in said bridge circuit for detecting said variations in current flow.

5. In a truck having a frame, a pedestal spaced from said frame, and a pressurized air system, a device for weighing the payload of said truck comprising a pneumatically operated cylinder, means securing said cylinder to said frame, a piston reciprocable in said cylinder, said piston having a stroke sufficient to engage said pedestal, a variable resistance means, means connecting said piston to said variable resistance means to vary the resistance of said variable resistance means in response to displacement of said piston, regulator means fed by said pressurized air system and supplying a predetermined air pressure to said cylinder to cause said piston to move sufficiently to bridge the space between said frame and said pedestal, an electrical power source energizing said bridge circuit, a solenoid operating said regulator means, a bridge circuit including said variable resistance means as one branch thereof, and a switch connected to simultaneously energize said bridge circuit and said solenoid.

References Cited by the Examiner

UNITED STATES PATENTS

| 357,854 | 2/1887 | Patterson | 177—136 |
| 3,078,937 | 2/1963 | Mehki et al. | 177—141 |
| 3,150,729 | 9/1964 | Mehki | 177—141 |
| 3,216,517 | 11/1965 | John | 177—210 X |

FOREIGN PATENTS 1,135,318  12/1956  France.

RICHARD B. WILKINSON, *Primary Examiner.*

R. S. WARD Jr., *Assistant Examiner.*